Patented Jan. 23, 1934

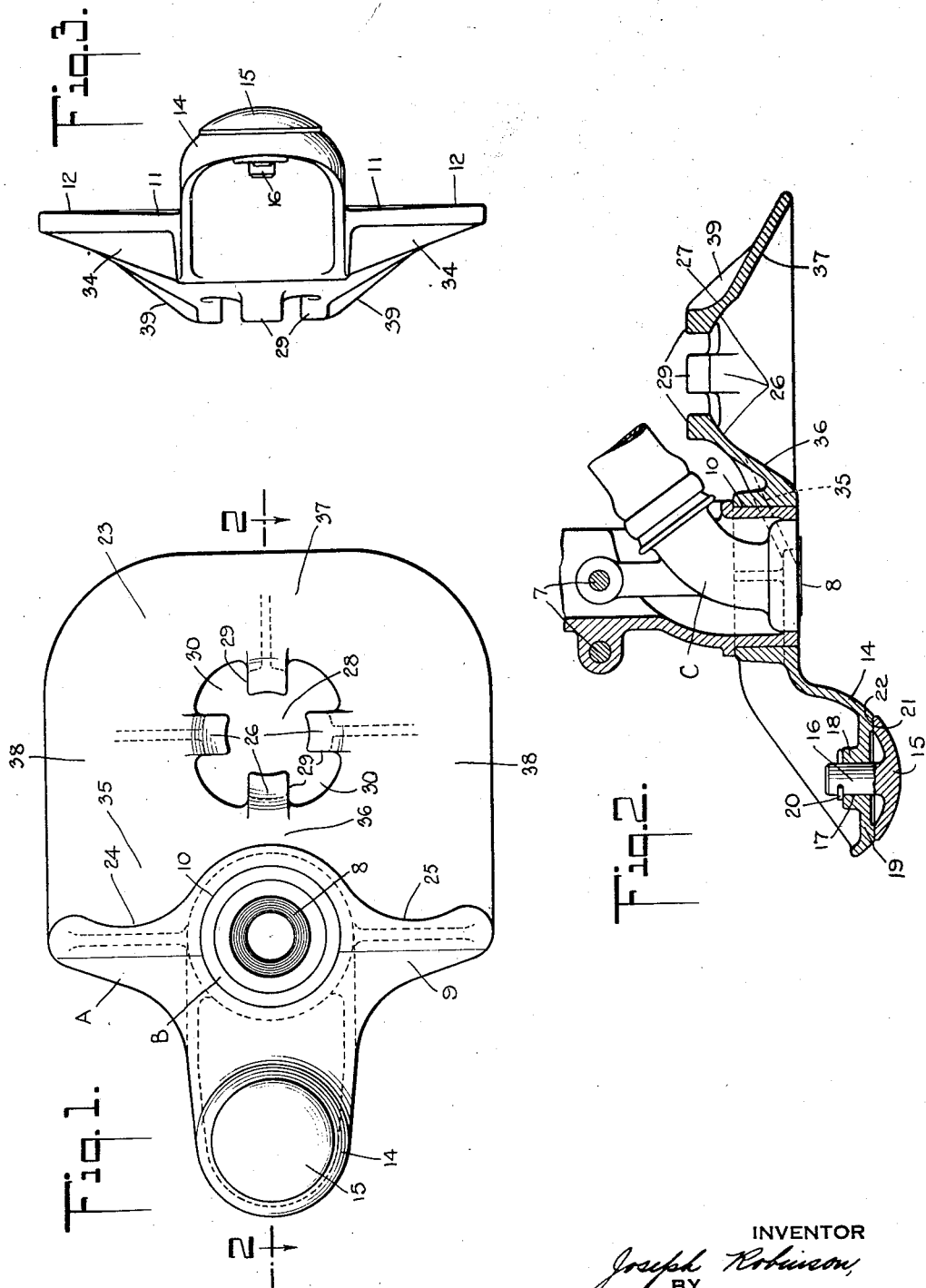

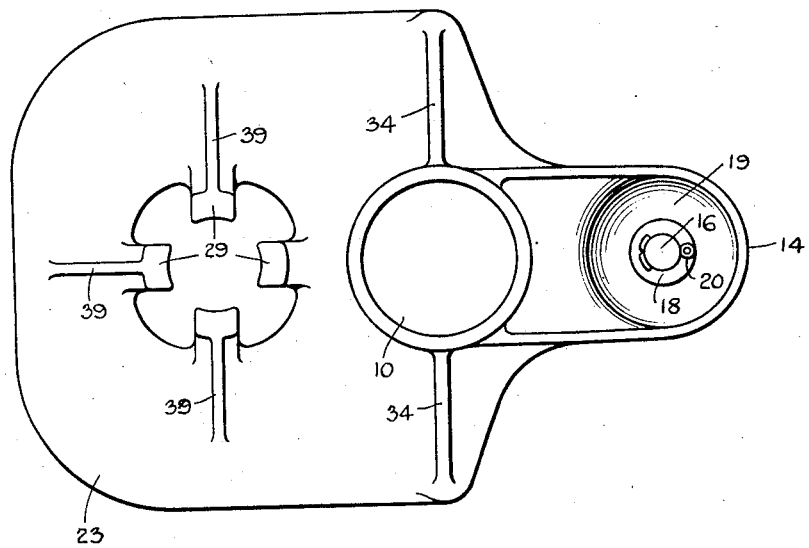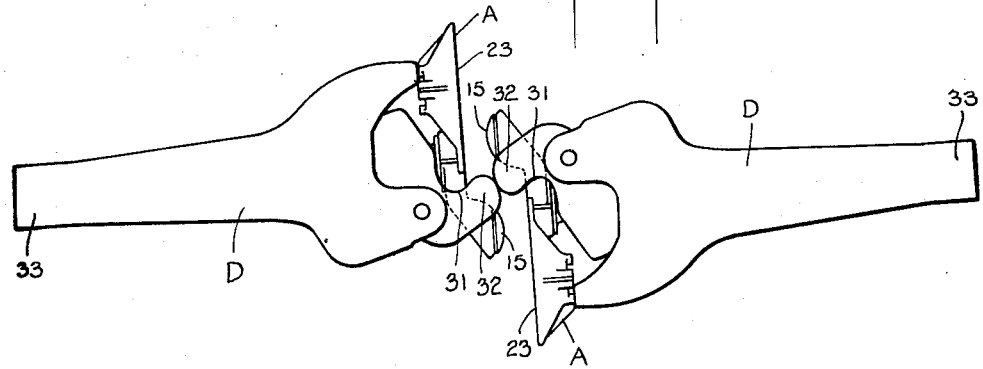

1,944,193

UNITED STATES PATENT OFFICE 1,944,193

AUTOMATIC TRAIN PIPE CONNECTER

Joseph Robinson, New York, N. Y., assignor of one-half to Roy M. Wolvin, Montreal, Quebec, Canada Application June 2, 1930, Serial No. 458,983
Renewed April 4, 1933

7 Claims. (Cl. 285—58)

This application is a continuation in part of my copending application Serial #537,827 filed February 20th, 1922, now Patent Number 1,761,845 granted June 3, 1930 for improvements in automatic train pipe connecters, and its object is to further improve the type of pin and funnel coupling head for such connecters disclosed in that application. In the said pending application the importance, in this type of coupling head, of a short pin and a shallow funnel is brought out. By extensive experimentation and many tests a way has since been found to further shorten the pin and lessen the depth of the funnel of the head with very important advantages resulting. The coupling head of the present application differs from the coupling head in my above copending application in the further respect that it is provided with a blunt wide nose which cannot damage the connecter gasket or port in case, as in some extreme coupling positions, it engages the same. The pin of the head is placed on the opposite side of the longitudinal direction of the connecter to that on which the pin of the coupling head in my above copending application is placed, and the further advantages hereinafter pointed out result therefrom. The outline of the face of the funnel shown in Figure 1 of my copending application above mentioned is retained as to its essential features, and the advantages thereof are brought out in this present application. Provision is also made in the present invention for preventing interference with the efficient operation thereof through the accumulation in the funnel of foreign substances. A removable and replaceable button or cap is provided on the nose of the pin of the present invention, and this cap is preferably hardened, or made of a harder material than the funnel is made of, whereby undue wear on the pin is prevented when it slides along the funnel.

In the drawings Figure 1 is a front elevation of my improvement and a part of a support therefor;

Figure 2 is a sectional view on the line 2—2 thereof;

Figure 3 is a side view of the construction shown in Figure 1;

Figure 4 is a rear view thereof, and

Figure 5 is a plan view of a pair of car couplers provided with connecters having my improved coupling head in one of the positions the couplers assume in service. In this position my improved coupling head has special functional advantages as later described.

It will be understood of course that any suitable form of supporting means may be employed to carry my improved coupling head, and that such supporting means may be attached thereto, or made integral therewith, in any desired manner. In the drawings I show the coupling head A pressed over a pipe or supporting member B having a hollow forward end in which is removably mounted, as by the plunger pin 7, a suitable conduit C carrying a gasket 8.

My improved coupling head A includes a vertically disposed face 9 lying preferably at a right angle to the longitudinal direction of the connecter. It is provided with a centrally located opening or port 10 and inclined surfaces 11 that lie above and below the opening and joined vertically disposed bearing surfaces 12 also above and below the opening 10. To the left of the center of the coupling head I provide a short wide blunt nosed guiding member or pin 14 having suitably secured thereto a separately formed removable cap or heel 15 preferably hardened or made of harder material than the other parts of the head are made of. I show this heel as having a shank or anchoring member 16 integral therewith (although it may be formed separately thereof) and pressed into the elongated bearing or opening 17 formed in a nipple 18 on the flat front wall 19 of the pin 14. The cap is anchored against accidental loss therefrom by a suitable pin 20, and it has an annular seat 21 machine fitted to a similar seat 22 on the pin 14. On the other side of the center line of the head A I provide a funnel 23 the inner walls of which immediately above and below the horizontal center line of the funnel incline inwardly or follow around the opening 10 towards the center of the head as indicated at 24 and 25. This feature is illustrated in Figure 1 of my aforesaid copending application and its importance will be later brought out.

When a pair of my improved coupling heads are connected the heel 15 rests in a complementary seat 26 at the apex or base 27 of the very shallow funnel 23, this seat being curved to correspond with the outline of the heel 15. It will be noted that the size and shape of the front face of the heel is such as to preclude any possibility of the pin 14 or the heel 15 fouling in the opening in the gasket 8 or damaging the gasket in case the heel 15 should strike it in a car coupler slip-by or under other extreme conditions of service. To prevent accumulation of foreign substances at this point in the funnel, which would interfere with a proper joint between the faces of my improved coupling heads, I provide the apex of the funnel with a large opening 28 and cut away the metal between the bearing points 29 as at 30 to the desired extent, preferably a substantial amount, thus minimizing the surfaces at this point on which foreign substances might objectionably accumulate and at the same time providing large exits, or ways, for the escape or discharge of such substances. In Figures 1 and 3 particularly, it will be noted that the length of the pin 14 and the depth of the funnel 23 is, relative to previous coupling heads of this type, very short and shallow. Flowing from this is the important advantages of great compactness and strength and the prevention—by reason of the sharp angles of the inner walls of the funnel—of lodgement thereon of foreign substances. There is also the further advantage of minimizing the extent to which the connecter head A projects beyond the face 31 of the car coupler D—see Figure 5—which preserves it against damage when carried against buffing posts and other obstructions in railroad yards. The arrangement also minimizes the likelihood of trainmen being injured by the projecting connecter head when they hurriedly pass around the end of a car.

Additional to the foregoing advantages is the further important one that the closer the car couplers can approach coupling engagement before the connecter heads engage the easier it is for the latter to make alignment. By placing the pin 14 on the left side of the coupling head vertical center as shown this advantage is secured. The head A may by this means be made much more compact with respect to its lateral width for the reason that when the car couplers are moved to their extreme coupling position—see Figure 5—their open knuckles 32 engage first. Inasmuch as these knuckles project farther in advance of the connecter head A than do the short pins 14 and shallow funnels 23 of my improvement the couplers are by them rolled into alignment as they come together. Thus the connecter heads are carried into substantial alignment before the pins 14, by reason of their compactness, enter the funnels 23. The advantages of this cooperative feature between the coupling parts of the car coupler and the connecter head has been developed through a long period of tests recently completed and has been found to give the present invention important service results over previous forms of this type of coupling head. As is well known, car couplers frequently slip by in service. When they slip by on the guard arm side, which is the side the funnel 23 (Figure 5) of my improved coupling head A is located on, the guard arms interlock, permitting the couplers to slip by a relatively limited extent. The extent is not sufficient to compress the supporting spring of the automatic connecter solid, or otherwise damage the support. But when a slip-by occurs on the knuckle side of the car coupler, it may be of very considerable extent, frequently amounting to as much as fifteen or twenty inches. In that case damage results to the connecter head, or to its supporting apparatus, unless the funnel of the head is located on the guard arm side of the coupler, as in the present invention, or unless a swivel joint such as shown at 19 in my copending application Serial No. 392,704, filed September 14, 1929, is employed. The reason for this is that if the funnel 23 is located on the knuckle side the funnels of opposing connecters will overlap extensively when the couplers slip by on the knuckle side, and prevent the supporting member B swinging to one side in its universal joint and allowing the heads to slip past each other. In consequence the supporting member is shoved rearwardly substantially on its longitudinal axis until the usual connecter buffer spring is compressed solid, whereupon the brackets or other part of the connecter are certain to be broken or damaged. By locating the pin 14 of my improved coupling head on the knuckle side of the car coupler, slip-bys on that side cause no damage whatever. The reason for this is that if the slip-by is between couplers of equal height, the pins, when they engage, either glance off each other or they slide into contact with the gaskets 8 of the connecter heads, without causing any damage whatever to the gaskets, whereupon the heads swing around through the medium of their universal supports B until the parts free themselves. If the slip-by is between couplers of unequal height, then the pins 14 either glance off each other and pass through the space lying between the numerals 9 and 14 in Figure 1, or the pins pass through that space without substantial contact or without any contact one with the other, depending upon the extent of inequality in the height of the car couplers. If the pins 14 engage the gaskets they do no damage thereto because, as aforesaid, the blunt relatively wide nose 15 of the pin is so much larger than the opening in the gasket that no damage to the gasket can result. The pins simply slide over or roll out of contact with the gasket.

It will also be appreciated that when the rear end 33 of the coupler—see Figure 5—is thrown to the extreme service position towards the right—the pin 14 of the coupling head A carried by it will point in the direction of the vertical center line of the opposing connecter head. If this lateral angling of the coupler is combined with extreme vertical variations the pin 14 will in coupling strike near the points 24 or 25 of Figure 1, depending upon which of the couplers is elevated. For these reasons the formation of the funnel at these points hereinbefore described is important as it permits the pin 14 to readily ride home to final seat in its bearing 26 in the apex or base of the funnel 23 from these extreme positions.

The ribs 34, Figure 1, serve to brace or reinforce the head, and the tapered surfaces 11 which join the vertically disposed bearing surfaces 12 of the head serve to prevent the upper or lower edges of the head fouling beneath these bearing points in coupling under conditions of substantial vertical variation or where one car coupler is dropped considerably. It will be noted in Figures 1 and 3 especially, that the inner walls 35, 36 and 37 of the funnel are flared or inclined at different angles, and from Figure 1 it will be noted that the upper and lower walls 38 of the funnel are inclined vertically at the same angle one with respect to the other, and that the seats 26 are reinforced on their rear sides by ribs 39.

A further advantage of locating the pin 14 on the left side of the connecter head A viewed from the front is that arrangement for most efficiently interchanging the connecter with non-connecter equipped cars is facilitated by it. An interchange device such as shown in my copending application Serial No. 342,686, filed February 26th, 1929, is given the needed free range of operative movement with the pin 14 located as shown, whereas if the funnel 23 were placed where the pin 14 is the interchange would be seriously obstructed in its operation. A different type of interchange, such for instance, as that which is clamped across the face of the connecter has to be used when the funnel is on the left side of the connecter head, and such interchange has strong features of objection.

It will of course be understood that the pin 14 and the heel or cap 15 may if desired be made of one piece, and that, obviously, my improved coupling head may be made of any suitable material and may be pressed of sheet metal.

What I claim is:

1. An automatic train pipe connecter head comprising in combination, pin and funnel gathering means of shallow construction, the pin member being short and blunt and having a wide aligning surface on its front face, the funnel being provided with a relatively large opening through its apex into which projects lugs having on their inner faces a seat to receive said pin member of an opposing head, there being formed between said lugs openings of substantial size to permit the exit of foreign substances from said funnel when opposing heads couple up in service.

2. An automatic train pipe connecter head comprising in combination, pin and funnel gathering means, a characteristic of the funnel being that it is very shallow with its inner walls flaring slowly at different angles, an opening of substantial diameter through the apex of said funnel, spaced bearing lugs projecting into said opening and having a seat on their front inner face, said lugs being reinforced with respect to said funnel, and a short blunt pin member adapted under different conditions to engage the several walls of said funnel on a mating head and slide into the bearings on said lug to align said coupling heads.

3. An automatic train pipe connecter head comprising in combination, pin and funnel gathering means of shallow construction, the pin member being short and wide and having a seat on its forward end, and a heel member formed separately of the head and mounted on said seat and formed preferably of harder material than the material of which the funnel is made.

4. An automatic train pipe connecter head of the pin and funnel type comprising in combination, a coupling face having vertically disposed bearing surfaces thereon, tapered surfaces leading from said bearing surfaces into the body of said face, said head having an opening disposed preferably midway between said bearing surfaces, the inner walls of said funnel member being slowly flared from points above and below said opening into the apex of the funnel, said apex being provided with inwardly extending lugs having a bearing formed on their front faces, a pin member projecting forwardly of the face of said head a short distance only and having a seat, and a hardened heel member removably mounted on said pin member and having a curved front face adapted to rest on the bearing of said lugs of an opposing connecter head for the purpose of aligning said head, the engagement of said bearing surfaces and of said heel with said bearing lugs being approximately coincident.

5. An automatic train pipe coupling head having a central portion provided with an opening for the passage of fluid, said central portion extending above and below said opening substantially on the vertical center line of the head, said head having on one side of said central portion a shallow funnel member formed integral therewith, said funnel member having the inner side thereof extending to substantially the vertical center line of the head and being formed integral with said central portion, said head having on the one side a pin member of short blunt formation having a rounded nose, the inner side of said pin member also being integrally connected to said central portion of the head, said funnel member having an opening through the bottom thereof, lugs extending transversely of said opening and shaped to form a seat, the nose of said pin member being shaped to fit said seat on a mating head when two heads are brought together.

6. A construction of the kind specified in claim 5 including a car coupler of the standard type having the usual guard arm on one side thereof and the usual pivoted coupling knuckle on the other side thereof, said funnel being positioned on the guard arm side of the car coupler, and said pin being also on the knuckle side of the car coupler.

7. An automatic train pipe coupling head having a central portion provided with an opening for the passage of fluid, said central portion extending above and below said opening substantially on the vertical center line of the head, said head having on one side of said central portion a shallow funnel member, said funnel member having the inner side thereof extending to substantially the vertical center line of the head, said head having on the one side a pin member of short blunt formation having a rounded nose, the inner side of said pin member also being connected to said central portion of the head, said funnel member having an opening through the bottom thereof, lugs extending transversely of said opening and shaped to form a seat, the nose of said pin member being shaped to fit said seat on a mating head when two heads are brought together.

JOSEPH ROBINSON.